US005307393A

United States Patent [19]
Hatfield

[11] Patent Number: 5,307,393
[45] Date of Patent: Apr. 26, 1994

[54] SPLIT VANE ALTERNATING SWIRL MIXING GRID

[75] Inventor: Stephen C. Hatfield, Granby, Conn.

[73] Assignee: Combustion Engineering, Inc., Windsor, Conn.

[21] Appl. No.: 905,922

[22] Filed: Jun. 29, 1992

[51] Int. Cl.⁵ .............................................. G21C 3/34
[52] U.S. Cl. .................................. 376/442; 376/438; 376/439; 376/462
[58] Field of Search ............... 376/439, 438, 462, 442, 376/448, 441, 443; 976/DIG. 71, DIG. 60, DIG. 78, DIG. 76

[56] References Cited

U.S. PATENT DOCUMENTS

| | | | |
|---|---|---|---|
| 3,423,287 | 1/1969 | Anthony | 376/442 |
| 3,764,470 | 10/1973 | Calvin | 376/439 |
| 3,787,286 | 1/1974 | Anthony | 376/439 |
| 4,357,298 | 11/1982 | Wolters, Jr. et al. | 376/444 |
| 4,396,573 | 8/1983 | Feutrel | 376/442 |
| 4,426,355 | 1/1984 | Burger | 376/442 |
| 4,717,585 | 12/1987 | Kast | 376/442 |
| 4,844,860 | 7/1989 | Hatfield | 376/439 |
| 4,897,241 | 1/1990 | Anthony | 376/438 |
| 5,024,810 | 6/1991 | Bachman | 376/438 |

*Primary Examiner*—Donald P. Walsh
*Assistant Examiner*—Meena Chelliah

*Attorney, Agent, or Firm*—L. James Ristas; John H. Mulholland

[57] ABSTRACT

A nuclear fuel assembly grid (100) made from a plurality of interlaced corrugated metal strips (102-116) forming an egg-crate configuration so as to define plurality of four-walled cells (118) for receiving respective individual fuel rods (120). The spaced apart vertical bend lines (160,162) of the currugation define vertices (130,132) and consecutive body panels (164,166) which alternate generally inwardly and outwardly between consecutive bend lines. A vertical slot (168) extending from one of the strip upper or lower edges (176) into each panel midway between consecutive bend lines, and overlapping a slot from an interlaced strip to form an hourglass-shaped cell having opposed convex walls and opposed concave walls and four 90 degree corners (150). Spring (148) and stop (153) structure projects from each wall of a cell, for centering and supporting the fuel rod within the cell. A flow deflector vane (122) extends from the upper edge of a convex wall adjacent one corner and is bent over in the inward direction generally toward the fuel rod in the cell. A tab (354) extends vertically from the upper edge of the concave wall adjacent the corner and the vane, for restricting lateral flow leakage around the vane. Each tab has a hood portion (355B) that projects toward the center of the cell in overlapping relation to the adjacent vane.

15 Claims, 7 Drawing Sheets

SPLIT VANE ALTERNATING SWIRL MIXING GRID

BACKGROUND OF THE INVENTION

The present invention relates to nuclear reactor fuel assemblies, and more particularly, to grids which carry dedicated structure for enhancing coolant mixing in the fuel assembly.

U.S. Pat. No. 4,879,090, "Split Vaned Nuclear Fuel Assembly Grid", issued Nov. 7, 1989 to Patrick A. Perrotti et al, discloses a nuclear fuel assembly grid in which mixing vanes project from the upper edges of the constituent strips, so as to induce a so-called "alternating swirl" flow pattern between adjacent cells of the grid. In other words, when viewed in plan, the swirl pattern induced by the vanes in one cell follows a clockwise direction, whereas the swirl flow pattern in an adjacent cell follows a counter-clock-wise pattern, such that the swirling flow midway between adjacent fuel rods, is generally in the same direction.

Such alternating swirl patterns have been shown to be very effective at improving heat transfer in a nuclear fuel assembly, relative to other mixing flow patterns that can be induced by dedicated mixing vane structure or the like. There are, however, at least two drawbacks to grids which have the split vane configuration such as shown in said patent. First, the cantilevered, free-standing vanes which project from the upper edges of the strips, are susceptible to bending damage during rod insertion for both initial fabrication and reconstitution. Secondly, free standing vanes suffer a loss of efficiency in flow redirection due to their relatively narrow width and the leakage losses at the open sides of the vanes.

Another disadvantage in some circumstances, is the incompatibility of the split vanes as formed on the flat strips from which the grid is constituted as shown in said patent, if incorporated into the "wavy strip", or "corrugated strip" grids of the type disclosed, for example, in U.S. Pat. No. 4,897,241 issued Jan. 30, 1990 to Anthony. The problem encountered is illustrated by FIGS. 1 and 2 which accompany the present specification. As shown in FIG. 1, if the cell walls are straight, they form squares having 90 degree corners. The vanes such as 10 and 12 which project from the upper edges of opposite walls 14, 16 of cell 18, have a straight edge 20,22 which extends perpendicularly from the upper edge of the given wall, and parallel to the adjacent wall 24, 26.

In the wavy strip type of grid the cells 28 are not rectangular. Rather, two adjacent convex walls 30,32 and two adjacent concave walls 34, 36 form four corners, one of which 38, defines an acute angle, two of which 40,42 define right angles, and one of which 44 defines an obtuse angle. In this situation, if a split vane such as 46 is formed on a wall adjacent an acute angled corner 38, the vane projects obliquely toward the adjacent cell 28, This has the effect of dissipating the swirl pattern that is desired around the given rod in the cell. This problem may generally be described as resulting from the difference, as viewed in plan, between the angle at which the vane projects from a given strip upper edge adjacent a corner, and the angle of the intersection of two strips at that corner.

SUMMARY OF THE INVENTION

It is, accordingly, an object of the present invention to obtain the advantages provided by the alternating swirl pattern achievable with the vane configuration such as shown in U.S. Pat. No. 4,879,090, while overcoming the susceptibility to damage during fabrication and reconstitution, and the performance losses resulting from lateral flow leakage.

It is another object of the present invention, to achieve the alternating swirl flow pattern using split vanes at the upper edges of the wavy strip type of fuel assembly grids.

The present invention is directed to an improved grid and associated grid strips, in which each strip contains rod support features in its lower portion and flow redirection features in its upper portion. The flow redirection features consist of "split vanes" of an improved design, alternating with vertical tabs which minimize lateral leakage of the flow that has been redirected by the adjacent vane and which preferably reinforce the vane to resist damage during fabrication or reconstitution.

In the preferred grid strip, a corrugated body portion has substantially rectangular length and height dimensions as viewed in a first, elevation plane and a serpentine shape when viewed in a second, edge plane, thereby defining alternating convex and concave angles having vertices that project inwardly and outwardly. The corrugations form spaced apart bend lines at the vertices, thereby defining consecutive body panels which alternate generally inwardly and outwardly between consecutive bend lines. A vertical slot extends from one of the upper or lower edges into each panel midway between consecutive bend lines. A cut out in the body portion is centered at each bend line and integrally forms a cantilevered spring having a base in one panel and a free end extending across a bend line and over to another panel. Adjacent flow deflector vanes extend from the upper edge of one panel on either side of a vertical extension of the slot in the one panel, one of the vanes being bent over in the inward direction and the other bent over in the outward direction. Adjacent flow confinement tabs extend from the upper edges of an adjacent panel on either side of a vertical extension of the slot in the adjacent panel, each tab being of substantially the same size as a vane.

In the preferred nuclear fuel assembly grid, a plurality of interlaced metal strips form an egg-crate configuration so as to define a plurality of four-walled cells for receiving a respective individual fuel rod. Each strip has a corrugated body portion having substantially rectangular length and height dimensions when viewed in elevation, and serpentine upper and lower edges, the edges having alternating convex and concave angles with vertices that project inwardly and outwardly, respectively. The corrugations form spaced apart vertical bend lines at the vertices, thereby defining consecutive body panels which alternate generally inwardly and outwardly between consecutive bend lines. A vertical slot extends from one of the upper or lower edges into each panel midway between consecutive bend lines, overlapping a slot from an interlaced strip, and together forming a 90 degree angled corner of a cell. The cells thus have opposed convex walls and opposed concave walls. Means project from each wall of a cell, for centering and supporting the fuel rod within the cell. A flow deflector vane extends from the upper edge of a convex wall adjacent one corner and is bent over in the inward direction generally toward the fuel rod in the channel. A flow deflector tab extends from the upper edge of the concave wall adjacent the corner and the vane.

The present invention offers a number of advantages relative to the straightforward use of conventional split vane mixing grids. For example, broader tips on the vanes are permitted because the basic geometry of the grid is such that the curved strips always bow away from the rod which is adjacent to the vane. In the conventional design or FIG. 1, the vane tip must be narrow enough to lie between a rod and the edge of a straight strip that is midway between neighboring rod. This advantage is a direct result of defining the cell by two opposed convex walls, and two opposed concave walls, rather than two adjacent convex walls and two adjacent concave walls.

The straight tabs of the present invention create a side wall along the side of the vane opposite the fuel rod. The side wall on one side of the vane and the fuel rod's proximity to the convex bend line at the other side of the vane act together to minimize lateral leakage of the coolant as redirected by the vane. More of the coolant will be deflected in the desired direction and less turbulence will be created. Turbulence tends to disrupt the beneficial flow swirl, diminishing its benefit in heat transfer downstream of the grid. Combined with the broader vane tip, the total flow redistribution becomes much more efficient than in the conventional split vane alternating swirl configuration such as shown in FIG. 1.

The side wall tabs also include projecting hoods or the like, which protect the vanes from damage during rod loading and operations. There are two variations of the hoods depending on whether they overlap on the top or bottom side of the mixing vane. As an out-of-position rod approaches a vane, it will contact a reinforced section which provide significant resistance to damage relative to that of a vane that is simply cantilevered without protection.

Thus, the present invention improves the hydraulic characteristic of a conventional alternating swirl mixing grid, while greatly reducing its susceptibility to damage during rod loading. The design also is compatible with grids which use the curved interior strips.

BRIEF DESCRIPTION OF THE DRAWINGS

These and other objects and advantages of the invention will be described below in the context of the preferred embodiment and with reference to the accompanying Figures, in which.

DESCRIPTION OF THE PREFERRED EMBODIMENT

Figure 1:
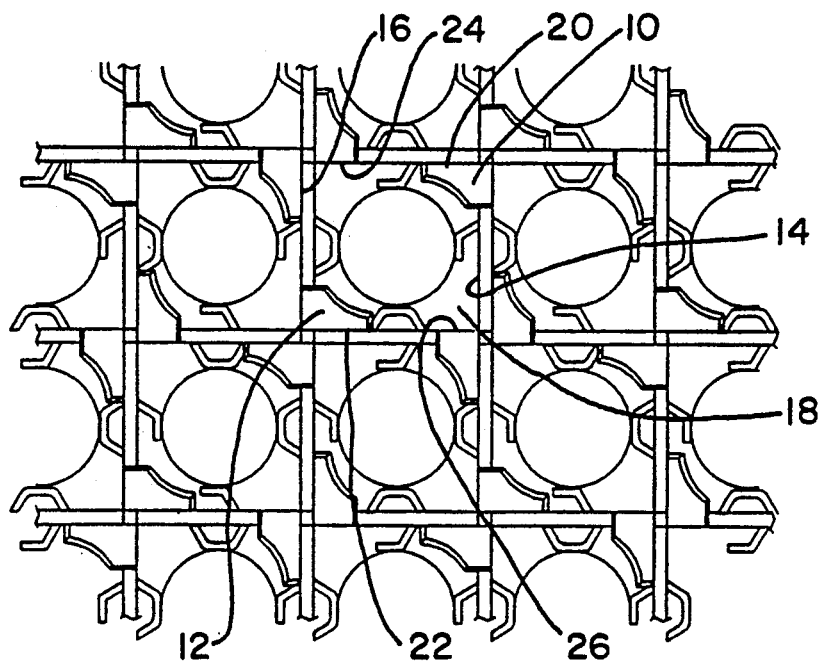
FIG. 1 is a plan view of a portion of a split vaned nuclear fuel assembly grid that produces an alternating swirl flow pattern according to the prior art.
Figure 2:
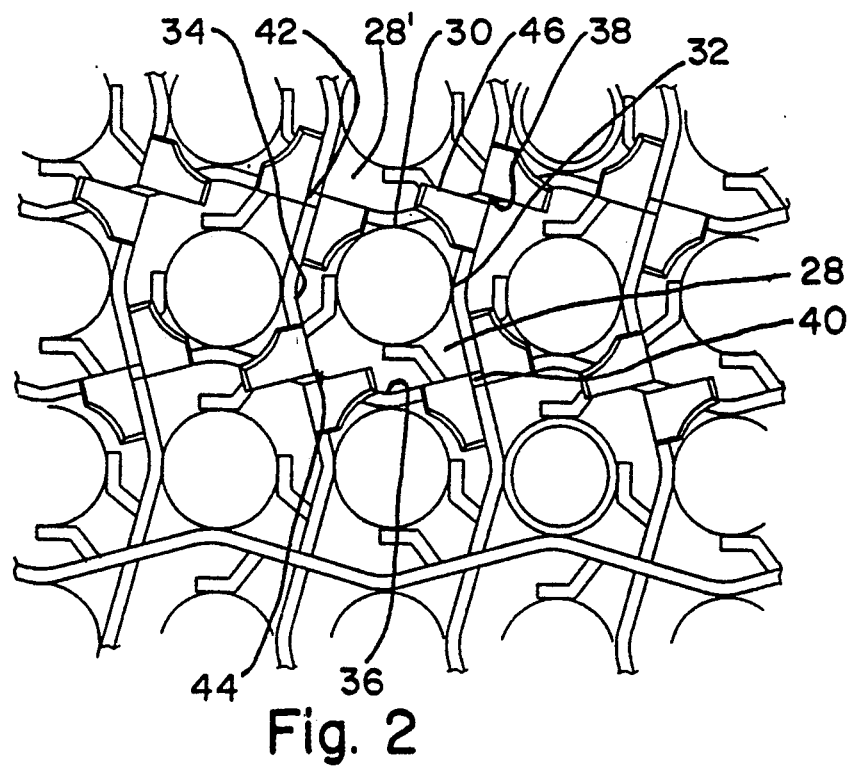
FIG. 2 is an illustration of the straightforward incorporation of the split vane technique of FIG. 1, into a curvy strip type of fuel assembly grid.
Figure 3:
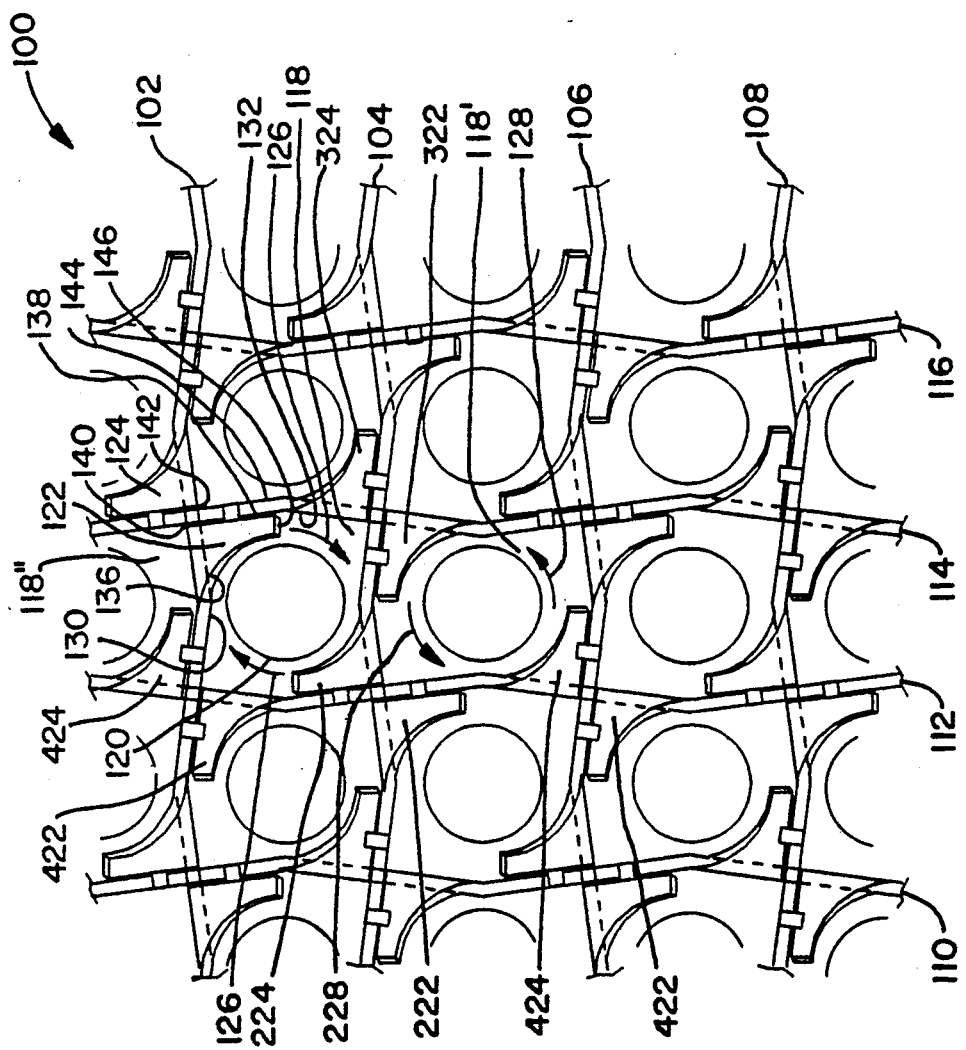
FIG. 3 is a schematic plan view of the preferred embodiment of the invention, but with the omission of fuel support structure for clarity.

FIG. 3 is a plan view of a portion of a nuclear fuel assembly grid 100 which embodies the preferred features of the present invention. The portion of the grid as shown in FIG. 3, includes four grid strips 102,104,106,108 oriented east-west on the figure, and four strips 110,112,114,116, oriented north-south on the figure. For convenient reference to three dimensions, the east-west direction will generally be referred to as the "X" direction, and the north-south will generally be referred to as the "Z" direction. These directions are mutually perpendicular to each other, and to the "Y" direction which extends into and out of the plane of FIG. 3.

The grid strips as shown in FIG. 3, are interlaced along the intersection of slots on the upper and lower edges thereof, to form four-walled channels or cells such as 118, each of which is sized to receive a fuel rod 120 which traverses the cell in the "Y" direction. Details of the features of the strips will be set forth below in connection with the description of FIGS. 7-17. The operational features of the invention will first be described with reference to FIGS. 3-6.

In the operating environment within a nuclear reactor, the coolant would flow through the grid in the "Y" direction, out of the plane of the drawing, toward the observer. The flow deflecting members 122,224 in accordance with the invention, produce a swirling flow, for example, clockwise 126 as shown in channel 118, and members 322,424 produce an oppositely directed, i.e., counter-clockwise flow 128, in the adjacent channel, such as 118'. In channel 118, the swirling flow is enhanced by the combined effects of vanes 122 and 224, which generally direct the flow in the "Z" direction, whereas the vanes 322 in channel 118' and 424 in channel 118" generally direct the flow in the "X" direction. The vane structure 122, 224 in a given channel 118, are provided in opposite corners, each imparting a transverse flow component in the opposite direction to the other vane, (i.e., negative "Z" and positive "Z").

Although the cell 118 has four square corners, the cell itself is not square or rectangular. This is due to the "wavy" or "corrugated" shape of each strip. Each cell such as 118 is defined by two opposed walls 102,104 that are convex, in the sense that the apex 130 of the walls point inwardly towards the fuel rod 120, whereas the other two opposed walls 112,114 may be considered concave, in that the apex 132 points away from the fuel rod. In this configuration, the cell walls closest to the rod, are on diametrically opposite sides of the rod, and likewise, the farthest distance of the cell walls to the rod, are at diametrically opposite points, 90 degrees offset. For reasons to be discussed more fully below, the diametrically opposed points on the rod which contact, or nearly contact, the apexes 130 of the two convex cell walls, are in the immediately vicinity of the location on the walls, where the curved side 136 of each vane projects from the upper edge of the wall. Although this curved side 136 generally follows the curvature of the fuel rod 120, close inspection will show that, preferably, the projection of the vane onto the "X-Z" plane, produces a radius of curvature on the side 136 of the vane 122, that is not centered at the axis of the fuel rod (assuming the fuel rod is centered in the cell).

It should also be noted that although the cell cross section is not square or rectangular, the intersections of the strips at the corners, are at right angles. Therefore, the straight side 138 of the vane, which projects perpendicularly from a point 140 at the upper edge of the cell wall 102 adjacent the strip intersection 142, remains parallel with the portion 144 of the adjacent cell wall 114 at the corner. One should note further that the tip 146, or free end of the vane 122 extends above the portion of the channel, where the walls are concave 132, i.e., farthest from the rod. As a result, the vane tip 146 can be rather wide, without overlapping into the adjacent channel, or encroaching upon the fuel rod.

Each cell 118,118' may thus be considered as having a shape resembling that of an hourglass. The associated major axis joining the concave apexes 132, is preferably at least about fifty percent greater than the minor axis joining the convex apexes 130. When the grid is viewed as in FIG. 3, it may be appreciated that the major and minor axes of the cells alternate between the "X" direction and the "Z" direction, as one observes the consecutive cells in a row ("X" direction) or column ("Z" direction).

Figure 4:
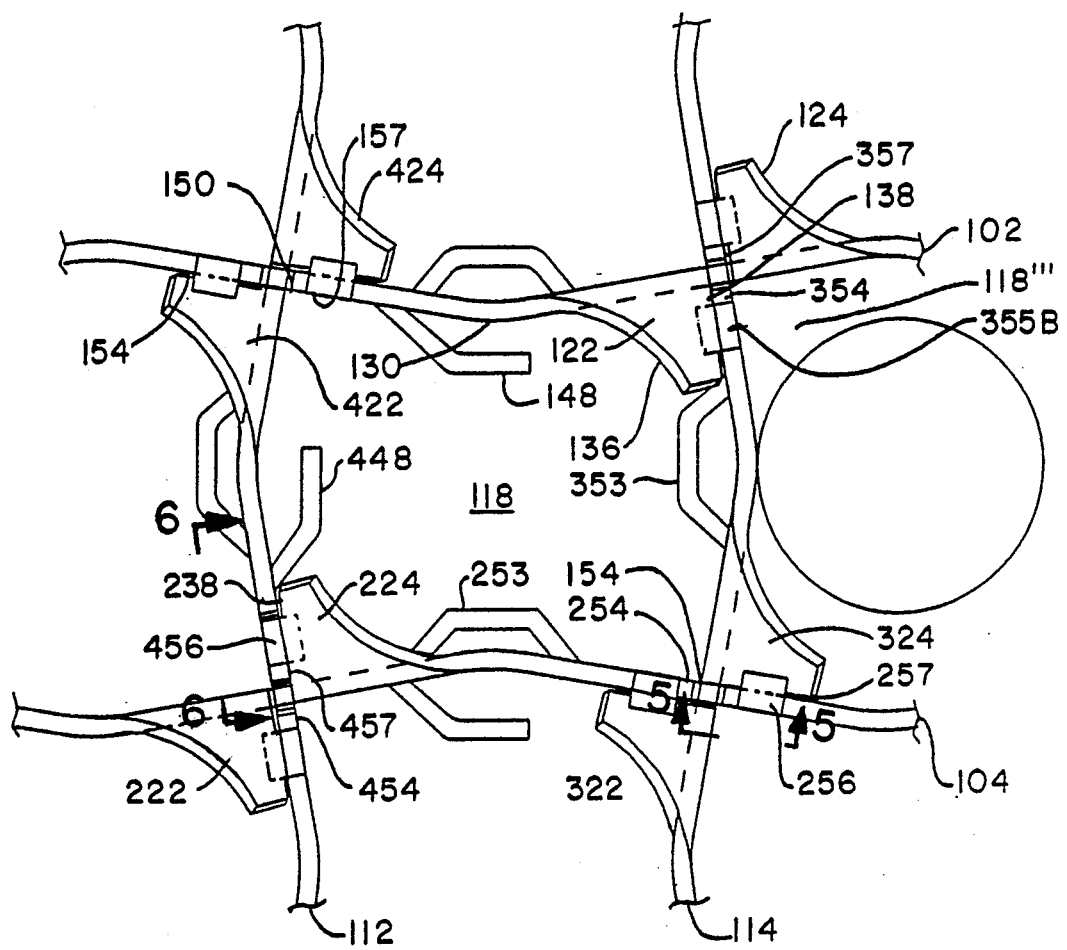
FIG. 4 is a plan view of one cell of the grid as shown in FIG. 3, enlarged to show the preferred details including full support structure.

FIG. 4 is an enlarged, detailed view of one cell in plan view, including fuel rod support structure which was omitted from FIG. 3 for clarity. FIG. 4 may be considered as more completely showing the cell 118 of FIG. 3, and alternating cells in the same row and column as that of 118. In FIG. 4, it may be seen that a cantilever spring 148 projects into the cell at a convex vertex 130, and another spring 448 projects into the cell from a concave vertex 132 on a cell wall that shares a common corner 150. Similarly, on the cell walls that share the opposite corner 152, a hard stop, or arch supports 253,353 are provided at a concave vertex and at a concave vertex. Once the rod has been inserted between the springs 148,448 and stops 253,353, the springs will deflect somewhat such that as the springs approach the adjacent side walls, the fuel rod surface also approaches the convex vertex 130.

An important feature of the present invention is the cooperation of tab structure 157,254,354, and 457 which extend in the "Y" direction (i.e., out of the plane of the paper in FIG. 4), to provide a side wall immediately adjacent the straight edge 138 of each vane such as 122. The tab 354 confines coolant as it is redirected by the vane 122, preventing lateral leakage flow above the adjacent channel 118'''. Most of the coolant which approaches the underside of the vane 122, is thus redirected in a swirling motion above the cell 118, adjacent to the fuel rod. The very close approach of the fuel rod to the convex vertex 130 near the base of the curved side 136 of the vane 122, also acts to limit leakage.

Figures 5, 6:
FIG. 5 is an elevation view taken along line 5—5 of FIG. 4.
FIG. 6 is an elevation view taken along line 6—6 of FIG. 4.

The tabs associated with the cell of FIG. 4, are shown in elevation view, in FIGS. 5 and 6. The tab 257A shown in FIG. 5, hereinafter referred to as type "A", includes a hood portion 256A which overlaps the vane 324 from above, whereas the type "B" tab 457B shown in FIG. 6, includes a smaller hood 456B that overlaps the underside of its associated vane 224. The hood portion of the tab provides support to prevent damage to the vane during the initial fabrication or later reconstitution of the fuel assembly, when individual fuel rods are run through the cells of a plurality of spaced apart grids.

Figure 7:
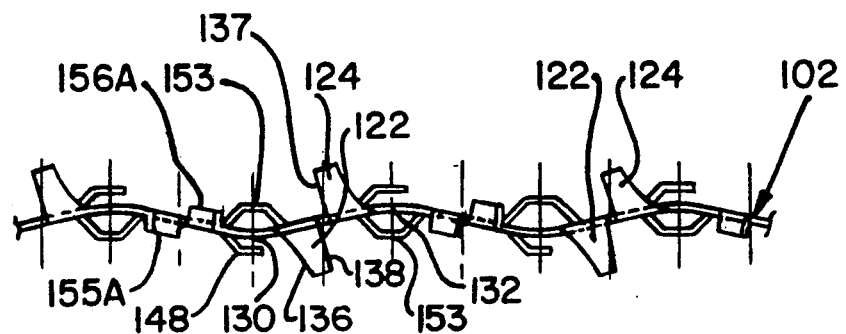
FIG. 7 is a plan view of a Type 1 strip in accordance with the present invention.
Figure 8:
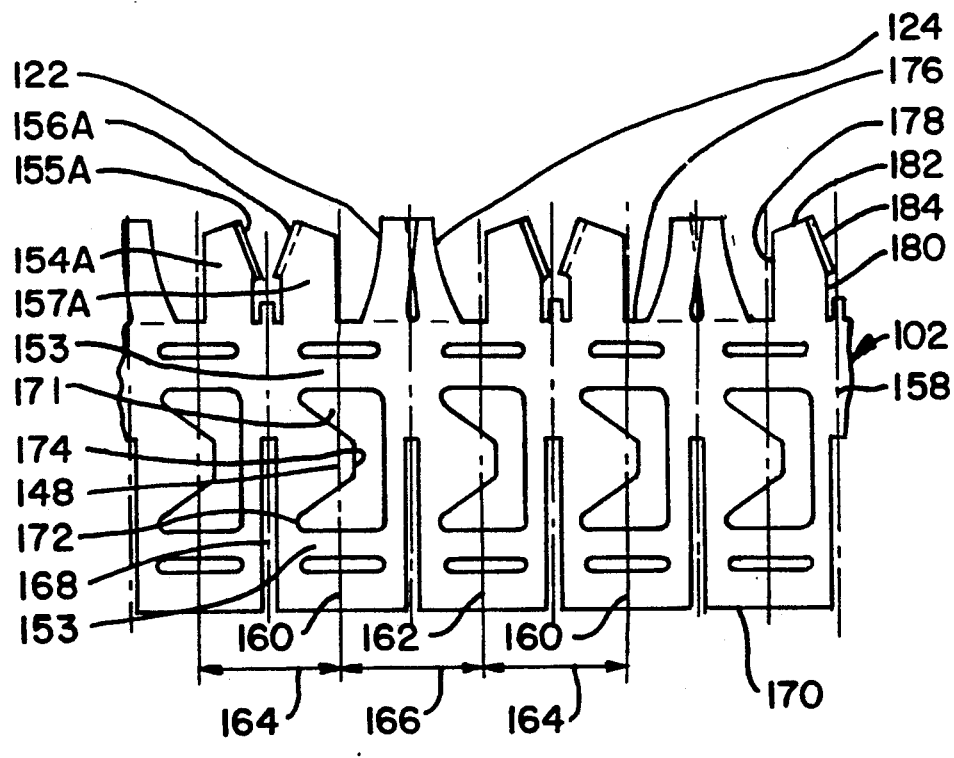
FIG. 8 is an elevation view of the Type 1 strip of FIG. 7.

Referring again to FIG. 3, four types of strips are necessary to produce the preferred configuration as shown. Strip Types 1 and 2 extend in parallel in the "X" direction, and alternate in the "Z" direction. Strip Types 3 and 4 extend in parallel in the "Z" direction, and alternate in the "X" direction. The details of the strips will now be described with reference to FIGS. 7-17. FIGS. 7 and 8 show the Type 1 strip 102. The strip has a corrugated body portion 158 having substantially rectangular length and height dimensions when viewed in the "X-Y", or elevation plane and a serpentine shape when viewed from the upper or lower edges in a second, edge, or "X-Z" plane, i.e., along the "Y" axis. The serpentine shape defines alternating convex 130 and concave 132 angles having vertices that project inwardly and outwardly, respectively, along the "Z" dimension. The corrugations thereby form spaced apart, alternating bend lines 160,162 in the "Y" dimension at the vertices. The bend lines define consecutive body panels 164,166 which alternate generally inwardly and outwardly between the consecutive bend lines.

A vertical slot 168 extends in the "Y" direction from the lower edge 170 into each panel, midway between the consecutive bend lines 160,162. A cut out 170 in the body portion centered at each bend line, integrally forms a cantilevered spring 148 having a base 172 in one panel 164 and a free end 174 extending across a bend line 160 and over to another panel 166. The spring projects in the "Z" direction, alternatingly inward and outward from bend line 160 to bend line 162 in the "X" direction. An integrally formed dimple or arch 153 is located above and below each spring 148, centered on a bend line 160, such that a given pair of upper and lower arches project in the same "Z" direction, which is opposite to that of its associated, intervening spring.

Flow deflector means in the form of adjacent vanes 122,124 extend from the upper edge 176 of one panel 166 on either side of a vertical extension of the slot 168 in said panel, one of the vanes being bent over in the inward "Z" direction, and the other bent over in the outward "Z" direction. The flow confinement means in the form of adjacent tabs 154A,157A extend in the "Y" direction from the upper edges of an adjacent panel 164, on either side of a vertical extension of the slot 168 in said adjacent panel. Each tab 154A can be substantially the same size as or larger than a vane 122.

An important aspect of the present invention is that although as viewed in FIG. 8 (the "X-Y" plane), the adjacent vanes 122, 124 of a pair appear to overlap at the extension of the slot, this is due to the illusion of a corrugated body portion viewed in a plane. In FIG. 7, the vanes 122,124 do not overlap when viewed in the "X-Z" plane, because each of the straight sides 137,138 of the adjacent vanes, is perpendicular to the upper edge of a corrugation panel or segment 166 extending between bend lines 160,162. Thus, the side edges 138,137 of the vanes 122,124 are parallel to each other in FIG. 7, as well as in FIGS. 3 and 4. It should be appreciated that this is a significant conclusion because the "split vanes" can be readily fabricated without the necessity to twist them relative to the portion of the upper edge 176 from which they project.

The Type 1 strip shown in FIGS. 7 and 8 has the type "A" tabs 154A,157A, which project vertically except that the hood portions 155A,156A are bent over at 90 degrees in the "Z" direction, one inwardly, and one outwardly for a given pair of tabs. The type "A" tabs such as 156A have first and second vertical sides 178,180, one of which is higher than the other, and two additional sides 182,184 which are at right angles to each other and which extend from the vertical sides. The material on each oblique side that faces the extension of the slot, is bent over to form the hood.

In FIG. 7, it may be seen that, starting from an arbitrary reference location such as bend line 160, one encounters an inwardly bent vane 122, an outwardly bent vane 124, an outwardly projecting spring 148 at an outward vertex 132 and an inwardly projecting arch 153 at said vertex, a first tab 154A with an inwardly projecting hood 155A, a second tab 157A with an outwardly projecting hood 156A, an inwardly projecting vertex 130 with an inwardly projecting spring 148 and an outwardly projecting arch 153. This pattern is repeated across the "X" dimension of the Type 1 strip.

Figure 9:
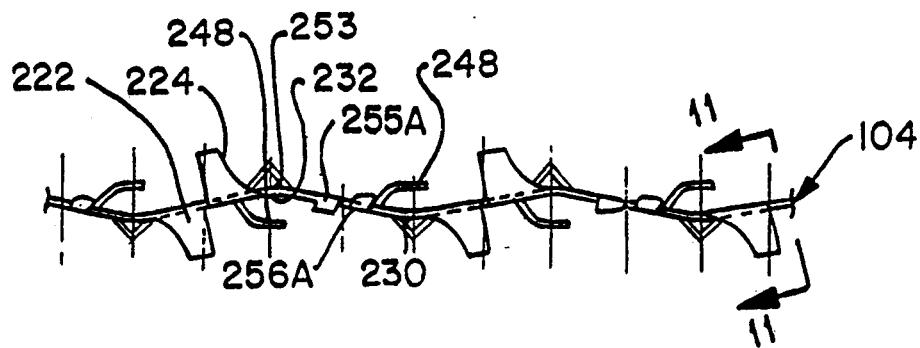
FIG. 9 is a plan view of a Type 2 strip in accordance with the present invention.
Figure 10:
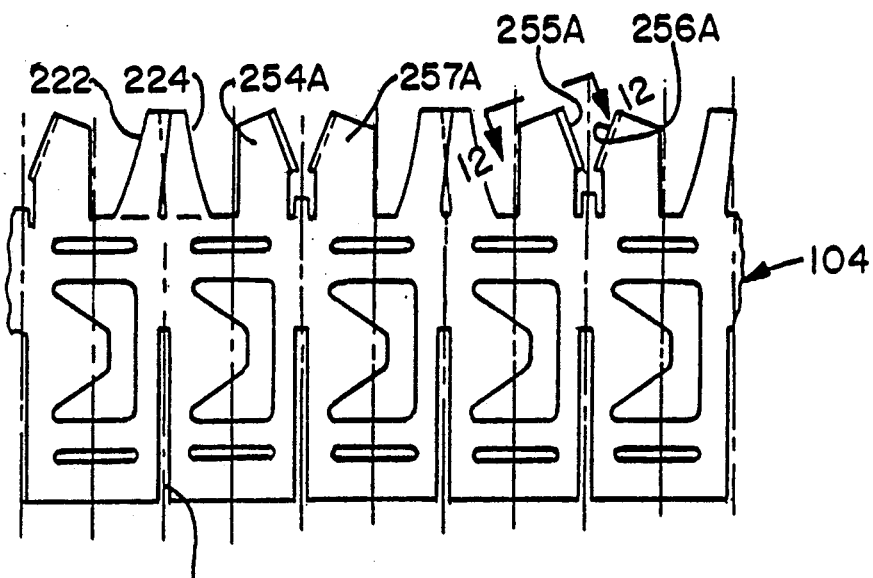
FIG. 10 is an elevation view of the Type 2 strip shown in FIG. 9.

The Type 2 strip shown in FIGS. 9 and 10 is similar in many respects to the Type 1 strip, except for the projection pattern in the "Z" direction, of the vanes and fuel support structure. Again starting at a position comparable to the starting position described with respect to FIG. 7, one first encounters a tab 254A with an inwardly projecting hood 255A and then a tab 257A with an outwardly projecting hood 256A, an inwardly projecting vertex 230 with an outwardly projecting spring 248 and inward arch 253, an inwardly projecting vane 222, an outwardly projecting vane 224, an outwardly projecting vertex 232 with an inwardly projecting spring 248 and outward arch 253. One can readily observe, that in the Type 1 strip, each spring 148 is associated with a convex bend line 130, whereas in the Type 2 strip shown in FIG. 9, each spring 248 is associated with a concave bend line 232.

Figure 11:
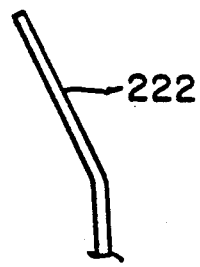
FIG. 11 is an end view along the direction 11—11 of FIG. 9.
Figure 12:
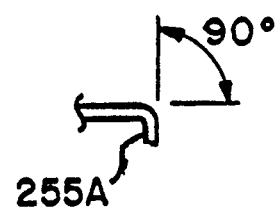
FIG. 12 is a view taken along direction 12—12 of FIG. 10.

FIGS. 11 and 12 show the preferred bend angle of a vane 222 when viewed along line 11—11 of FIG. 9, and FIG. 12 shows the hood portion 255A of the tab 254A as viewed along line 12—12 of FIG. 10. The type "A" tabs shown in FIGS. 7-10, overlap vanes in Type 3 and 4 strips from above, as shown in FIG. 4.

Figure 13:
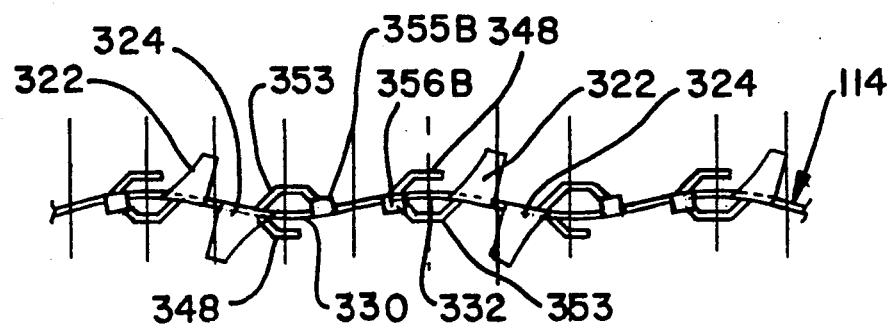
FIG. 13 is a plan view of a Type 3 strip in accordance with the invention.
Figure 14:
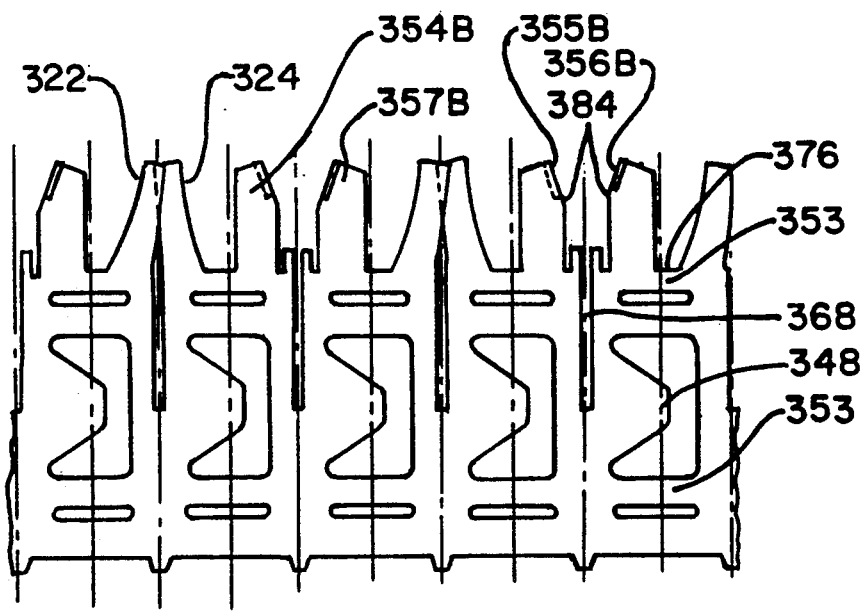
FIG. 14 is an elevation view of the Type 3 strip of FIG. 13.
Figure 15:
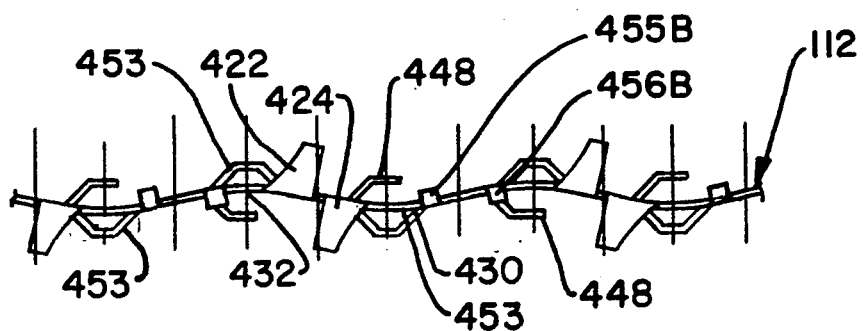
FIG. 15 is a plan view of a Type 4 strip in accordance with the invention.
Figure 16:
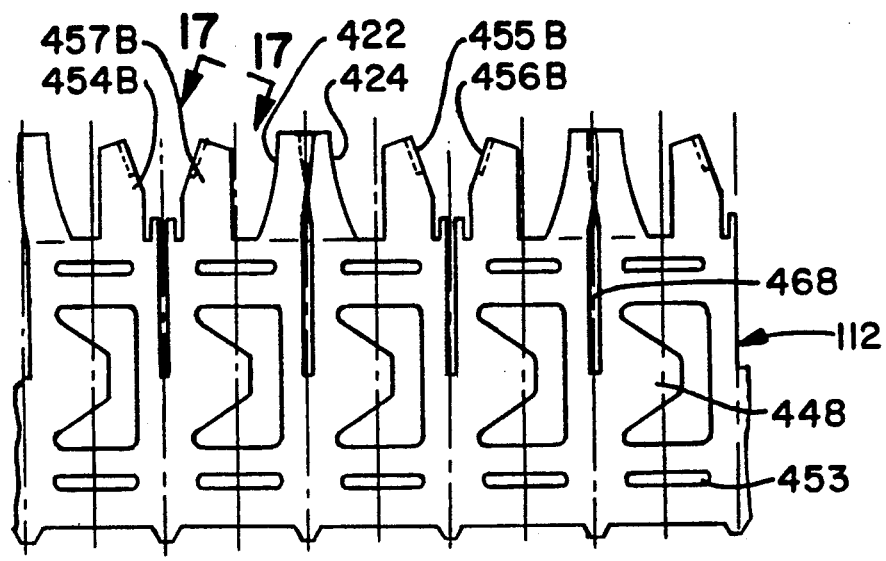
FIG. 16 is an elevation view of the Type 4 strip of FIG. 15.

FIGS. 13 and 14 show a Type 3 strip, which is similar to the Type 1 and Type 2 strips, except that the slot 368 extends from the upper edge 376 inwardly through the panel to approximately the mid line of the strip. Another difference is that the Type 3 strips have the type "B" tabs 354B,357B, which closely resemble the type "A" tabs, except that the hood portion 355B,356B extends only along approximately the upper half of the sides 384 of adjacent tabs that face each other. These hoods are shorter in this respect, primarily to facilitate the insertion of the cross strips 102,104 into the slots 368 of strips 114. In the Type 1 and 2 strips, which have the type "A" tabs, the slots 168,268 extend from the lower edge of the strip, and therefore an intersecting strip will not be lowered in between adjacent tabs during fabrication If one takes a starting point in FIGS. 13 and 14 analogous to the starting points described above with respect to FIGS. 7 and 9, one encounters an outward hood 355B and then an inward hood 356B, an outwardly vertex 332 with an outward spring 348 and inward arch 353, an outward vane 322, an inward vane 324, and an outward arch 353 and an inward spring 348, at an inward vertex 330. The Type 3 strip is similar to the Type 1 strip, in that the springs are provided at the convex portions 330 of the bend lines. The Type 4 strip shown in FIGS. 15 and 16, is similar to the Type 2 strip, in that the springs 448 are provided at the concave vertices 432.

Figure 17:
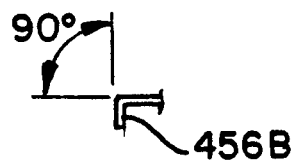
FIG. 17 is a view taken along line 17—17 of FIG. 16.

FIG. 17 is similar to FIG. 12, in showing the hood portion 456B of the "B" type tabs such as 457B.

I claim:

1. A unitary three dimensional grid strip for a nuclear fuel assembly grid, comprising:

a corrugated body portion having substantially rectangular length and height dimensions as viewed in a first, elevation plane extending in respective X and Y orthogonal dimensions, and a serpentine shape when viewed in a second, edge plane extending in orthogonal X and Z dimensions, the serpentine shape defining alternating convex and concave angels having vertices that project inwardly and outwardly, respectively, along the Z dimensions, the corrugations forming spaced apart bend lines in the Y dimension at said vertices, thereby defining consecutive body panels which alternate generally inwardly and outwardly between consecutive bend lines;

a vertical slot extending in the Y dimension from one of the upper or lower edges into each panel midway between consecutive bend lines;

a cut out in the body portion centered at each bend line and integrally forming a cantilevered spring having a base in one panel and a free end extending across a bend line and over to another panel;

flow deflector means int eh form of adjacent vanes extending from the upper edge of one panel on either side of a vertical extension of the slot in said one panel, one of the vanes bent over inwardly and the other bent over outwardly; and flow confinement means in the form of adjacent tabs extending int he Y direction from the upper edge of an adjacent panel, on either side of a vertical extension of the slot in said adjacent panel, each tab being of substantially the same size as a vane.

2. The grid strip of claim 1, wherein each tab includes an integrally formed hood portion that is bent over from the vertical portion of the tab.

3. The grid strip of claim 1, wherein each vane has a first straight edge, which projects substantially perpendicularly from a point on the upper edge of the panel that is substantially in vertical alignment with the slot of the panel, a second straight edge, which is substantially parallel to the upper edge of the panel, and a third edge, which curves from the second edge to the upper edge of the panel.

4. The grid strip of claim 1, wherein each tab has a first straight edge, which projects substantially vertically from the upper edge of a panel, a second straight edge, which projects substantially vertically a shorter distance than the first edge, from a point on the upper edge of a panel that is substantially in vertical alignment with the slot of the panel, an oblique edge extending from the first edge, and an integrally formed hood that is bent over outwardly or inwardly and extends between the oblique and second edges of the tab.

5. The grid strip of claim 3, wherein each tab has a first straight edge, which projects substantially vertically from the upper edge of a panel, a second straight edge, which projects substantially vertically a shorter distance than the first edge, from a point on the upper edge of a panel that is substantially in vertical alignment with the slot of the panel, an oblique edge extending from the first edge, and an integrally formed hood that is bent over outwardly or inwardly and extends between the oblique and second edges of the tab.

6. The grid strip of claim 2, wherein each vane has a first straight edge, which projects substantially perpendicularly from a point on the upper edge of the panel that is substantially in vertical alignment with the slot of the panel, a second straight edge, which is substantially parallel to the upper edge of the panel, and a third edge, which curves from the second edge to the upper edge of the panel.

7. A nuclear fuel assembly grid comprising:
- a plurality of interlaced metal strips forming an egg-crate configuration so as to define a plurality of four-walled cells for receiving respective individual fuel rods;
- each strip having a corrugated body portion of substantially rectangular length and height dimensions when viewed in elevation, and serpentine upper and lower edges, whereas the body portion defines alternating convex and concave angles having vertices that project inwardly and outwardly, respectively, the corrugations forming spaced apart vertical bend lines at said vertices, thereby defining consecutive body panels which alternate generally inwardly and outwardly between consecutive bend lines;
- a vertical slot extending from one of the upper or lower edges into each panel midway between consecutive bend lines, and overlapping a slot from an interlaced strip to form a cell having opposed convex walls and opposed concave walls and four 90 degree corners;
- means projecting from each wall of a cell, for centering and supporting the fuel rod within the cell;
- first flow deflector means in the form of a vane extending from the upper edge of a convex wall adjacent one corner and bent over in the inward direction generally toward the fuel rod in the cell; and
- second flow deflector means in the form of a tab extending vertically from the upper edge of the concave wall adjacent said one corner and said vane.

8. The grid of claim 7, wherein the cells have an hourglass shape in cross section, and the distance between the convex bend lines of the opposed walls in the cell defines a cell minor axis that is substantially the same as the diameter of the fuel rod.

9. The grid of claim 7, wherein another of said vanes extends from the upper edge of the other convex wall of said cell adjacent the corner diagonally opposed to said one corner of the cell and bent over in the inward direction generally toward the center of the cell, and another of said tabs extends from the upper edge of the other concave wall adjacent said diagonally opposed corner.

10. The grid of claim 9, wherein each tab has a hood portion that projects toward the center of the cell in overlapping relation to the adjacent vane.

11. The grid strip of claim 7, wherein each vane has a first straight edge, which projects substantially perpendicularly from a point on the upper edge of the wall that is substantially in said one corner, a second straight edge, which is substantially parallel to the upper edge of the wall, and a third edge, which curves from the second edge to the upper edge of the wall.

12. The grid strip of claim 7, wherein each tab has a first straight edge, which projects substantially vertically from a point on the upper edge of the wall adjacent a concave bend line, a second straight edge, which projects substantially vertically a shorter distance than the first edge, from a point on the upper edge of a panel that is substantially in said corner, an oblique edge extending from the first edge, and an integrally formed hood that is bent over so as to overlap the adjacent vane.

13. The grid strip of claim 11, wherein each tab has a first straight edge, which projects substantially vertically from a point on the upper edge of the wall adjacent a concave bend line, a second straight edge, which projects substantially vertically a shorter distance than the first edge, from a point on the upper edge of a panel that is substantially in said corner, an oblique edge extending from the first edge, and an integrally formed hood that is bent over so as to overlap the adjacent vane.

14. The grid of claim 8, wherein the distance between the concave bend lines of the opposed walls in the cell, defines a cell major axis that is at least about 50 per cent greater than said minor axis.

15. The grid of claim 9, wherein
- the cells have an hourglass shape in cross section, and the distance between the convex bend lines of the opposed walls in the cell defines a cell minor axis that is substantially the same as the diameter of the fuel rod;
- the distance between the concave bend lines of the opposed walls in the cell, defines a cell major axis that is at least about 50 per cent greater than said minor axis;
- each vane of said cell has a first straight edge, which projects substantially perpendicularly from a point on the upper edge of the wall that is substantially in a corner, a second straight edge, which is substantially parallel to the upper edge of the wall, and a third edge, which curves from the second edge to the upper edge of the wall; and
- the second edges of the vanes in said cell are colinear, said colinear line passing through the cell flow axis.

* * * * *